WILLIAM A. NICHOLS.
Improvement in Supporting Wagon-Bodies upon Rubber Springs.
No. 126,153. Patented April 30, 1872.
Fig: 1.
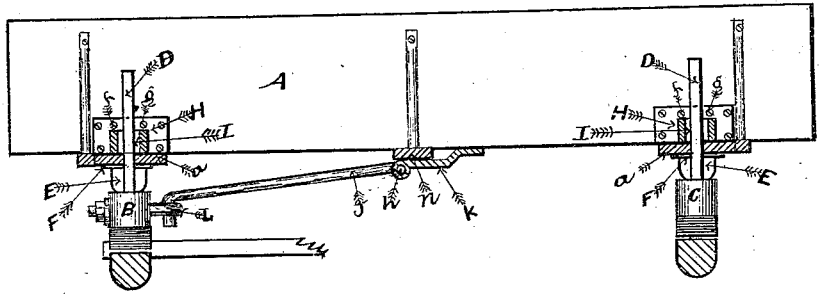
Fig: 2.
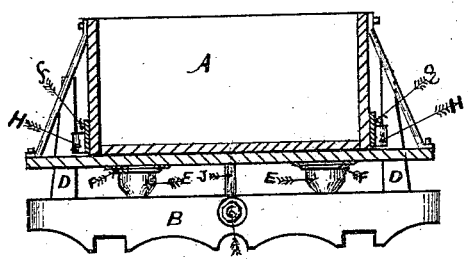
Fig: 3.
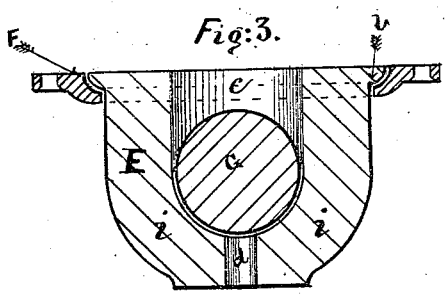
Fig: 4.
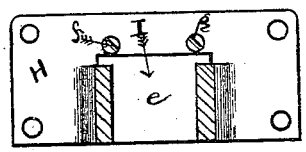
Fig: 5.
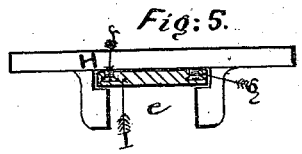
WITNESSES:
Richard Berner
Franklin Barritt
INVENTOR:
William A. Nichols
pr Henry Berner
Attorney

UNITED STATES PATENT OFFICE.

WILLIAM A. NICHOLS, OF ZIONSVILLE, INDIANA.

IMPROVEMENT IN SUPPORTING WAGON-BODIES UPON RUBBER SPRINGS.

Specification forming part of Letters Patent No. 126,153, dated April 30, 1872.

Specification describing certain Improvements in Wagon-Springs and Wagons, invented by WILLIAM A. NICHOLS, of Zionsville, Boone county, Indiana.

The object of my invention is to produce for wagons and other vehicles an India-rubber spring, which shall be much more flexible under both light and heavy loads; and also be more simple and convenient in its mode of attaching to and detaching from the wagon or vehicle than the India-rubber springs at present used; and in connection with my spring I have invented, also, a coupling-rod and a guard or anti-friction plate for the wagon-body, both of which I desire to embrace with my spring, as they are necessary to the operation of the same.

In order to describe my invention, I will refer to the accompanying drawing.

Figure 1 is a side view of a wagon embodying my invention. Fig. 2 is a rear view of the same. Fig. 3 is an enlarged detached cut sectional view of the spring. Fig. 4 is an enlarged detached front view of the guard or anti-friction plate. Fig. 5 is an enlarged detached top view of the same.

Letter A represents the wagon-body. B and C are front and rear bolsters, having standards D. E are cup-like India-rubber springs, fastened to the cleats $a$ by means of the metallic rings F. The spring E is made, as shown in Fig. 3, having a projecting rim, $b$, around its upper edge. This rim fits into a corresponding socket or recess in the ring F. The walls of the spring E are curved or oval at $i$, toward the bottom. This curved part is to give greater flexibility under light load. In the middle of the spring E is a chamber or opening, $c$, concave at its bottom to fit the ball G. The object of the chamber $c$ is twofold: first, to lighten the spring and give it greater flexibility; second, to insert the India-rubber ball G. The depth of the chamber $c$, as shown in Fig. 3, is greater than the diameter of the ball G, so that the upper part of the chamber is left unfilled. This allows the spring E, when under light load, to spring easily and freely in its curved or convex part $i$, without calling the ball G into action. At the termination of chamber $c$ is a small hole, $d$, designed to remove any dirt or water that might accumulate in chamber $c$. The object of the ball G is twofold: first, the spring E, being so constructed as to be quite flexible under light load, is inadequate to support heavy loads; hence, under heavy load it is so compressed that the cleat $a$ presses down upon the ball G, which is thus made to assist the spring E; second, under moderate and heavy loads the cleat $a$ presses down upon the ball G and increases its lateral diameter, causing it to expand against the walls of the spring E, by which means said walls are made more flexible in their straight or perpendicular part. The metallic ring F has holes in its outer edge for inserting screws through into the cleat $a$. The cleats $a$ are fastened to the bottom of the wagon-body by screws or other suitable means. The springs E are not fastened to the bolsters, but are rested loosely upon them. To prevent the wagon-body, together with the springs, from sliding off the bolsters, I use a longitudinal coupling-rod, J, which connects the body to the rear bolster. The front end of this coupling is connected to the iron plate or anchor K by means of pin $h$, said anchor K being fastened underneath the body to cleat $n$ by means of screws or small bolts. The rear end of the coupling-rod has a hook-shape, and is hooked into the loop or eye L, firmly secured through the rear bolster. Being centered on pin $h$, this coupling-rod is easily hooked or unhooked, at pleasure. To prevent the wagon-body from being pressed or wedged tightly against the standards, and thus hindering its free motion upon the springs, I have placed between the standards D and the sides of the body A, guards or anti-friction plates H, fastened to the sides of the body by screws or other suitable means. These plates have guideways $e$, (see Figs. 4 and 5,) in which the standards play loosely. To prevent the metallic plate H from grating and wearing against the standard, I have inserted a piece of thick leather, I, which rests in grooves or recesses on either side of the guide-way $e$, and which is held down in said grooves by means of projecting screws $f$ and $g$. At the front standards the plate H performs also another office, namely, prevents the front bolster from turning upon its center, and thus shifting partially or entirely from under the springs.

To operate my invention, the springs E are first set into the rings F, and then, by means of screws inserted through the holes in said rings, they are securely fastened to the cleats *a*. After this is done, the cleats *a* are fastened to the bottom of the wagon-body, as explained above. This being done, the body is set upon the bolsters, the springs resting loosely upon the same. The anti-friction plates being placed in position, as explained above, the standards D will pass into the guide-ways *e*. Then the coupling-rod J is hooked into the eye L. In order to remove the wagon-body together with the springs, it is only necessary to unhook the coupling-rod J at the rear bolster and lift the body off.

Having thus described my invention, I desire to claim the following:

In combination with the wagon-body A, bolsters B and C, and standards D, the India-rubber spring E having rim *b*, chamber *c*, hole *d*, concavo-convex sides *i*, the India-rubber ball G, the cleat *a*, the ring F, the longitudinal coupling-rod J, anchor K, pin *h*, eye L, the anti-friction plate H, guide-way *e*, washer I, screws *f* and *g*, all substantially as and for the purpose hereinbefore set forth.

WILLIAM ARTHUR NICHOLS.

Witnesses:
   MORGAN B. SHAW,
   JACOB WATTS.